July 12, 1932. R. K. LEE 1,867,365

MOTOR MOUNTING

Filed March 14, 1930

INVENTOR
ROGER K. LEE.
BY
ATTORNEY

Patented July 12, 1932

1,867,365

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

MOTOR MOUNTING

Application filed March 14, 1930. Serial No. 435,904.

This invention relates to a bracket and more particularly to a bracket adapted to form a supporting connection between the side frame member of an automobile chassis and an internal combustion engine.

An object of the invention is to provide a bracket which may be secured to either the internal combustion engine or the chassis frame and slid into inter-engaging position with attaching means on either the engine or the frame member. Preferably I prefer to secure the brackets to the engine and move the engine and bracket longitudinally of the vehicle to connect the bracket to its securing means on the frame.

More specifically stated the invention consists in providing openings in a bracket which permit one face of the bracket to be secured to outwardly extending projections on a supporting member by moving the bracket in a direction at right angles to the projection.

Other objects and advantages of the invention will more fully appear from the following description taken in connection with the accompanying drawing in which.

Figure 1:
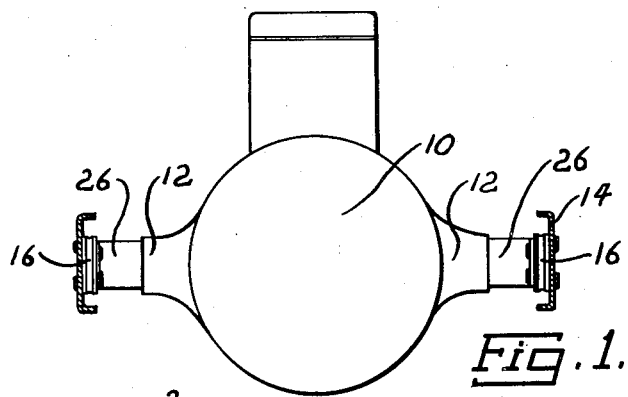
Fig. 1 is an end view of an internal combustion engine supported between side frame members of an automobile chassis, the frame members being shown in section.

Referring to the drawing the reference numeral 10 designates an internal combustion engine having laterally extending arms 12. A pair of channel frame members 14 are shown as the side frame members of an automobile chassis to which are secured resilient connections 16.

The resilient connection which I have selected for illustrating a preferred embodiment of my invention comprises a pair of oppositely spaced plates 18 secured together by a rubber member 20, having its opposite faces vulcanized to the adjacent faces of the plates 18. Securing means, such as bolts 22 and 23, extend through the plates 18, the bolt heads being positioned on the inner faces of the plates 18 and embedded in the rubber material 20. The bolts 22 project outwardly to form a means for securing the resilient connections 16 to the side frame members 14 and the bolts 23 project inwardly to form a connection between the engine and the resilient connection 16. The bolts 22 in the plate adjacent the frame 14 extend through the central portion of the channel frame and nuts 24 secure the resilient connection to the frame with the bolts 23 on the opposite side of the connection extending inwardly toward the outwardly extending arms 12 of the engine 10.

A bracket 26 is secured to each of the arms 12 by bolts 28 extending through openings 30 in the base or connecting portion 32 of a channel shaped bracket. The bracket is shown as a channel section having a base or connecting portion 32, side flanges 34, and outwardly extending flanges 36 at the outer ends of the side flanges 34. The outwardly extending flanges 36 are adapted to be secured to the bolts 23 and the base portion 32 is adapted to be secured to the arms 12.

Heretofore it has been necessary to secure brackets to the inwardly extending bolts 23, position the engine between the brackets and then secure the base portions 32 of the brackets to the engine. This has been difficult due to the fact that the bolts 28 are not easy to tighten when the bracket is secured to the frame or the resilient connection therebetween. If the bracket is secured first to the engine and then assembled in the frame it has been practically impossible to position the outer ends of the bracket over the inwardly projecting bolts 23. This however has been the practice when the bolts have been applied to the resilient mounting after the bracket is in position.

My improved mounting has one of the outwardly extending flanges 36 provided with openings in the form of slots 38 extending through the marginal edge of the flange 36. The slots 38 are approximately the width of the diameter of the bolts 23. The other flange 36 is provided with openings in the form of slots 40 extending from approximately the central portion of the flange 36 inwardly to and through the juncture of one of the side flanges 34 and the flange 36. The slot is continued upwardly into the side flange 34 a distance greater than the length of the bolts 23.

Figures 2, 3:
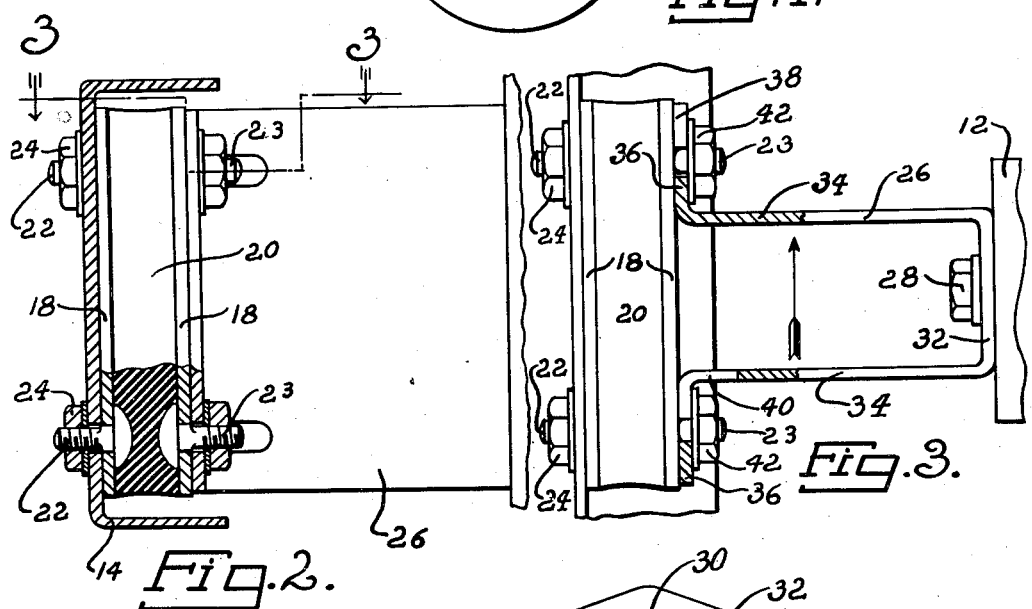
Fig. 2 is an enlarged view showing my improved bracket in side elevation secured to a channel frame member, shown in section, and a resilient connection therebetween broken away and partly in section.
Fig. 3 is a view taken on line 3—3 of Fig. 2, parts broken away and in section.
Figure 4:
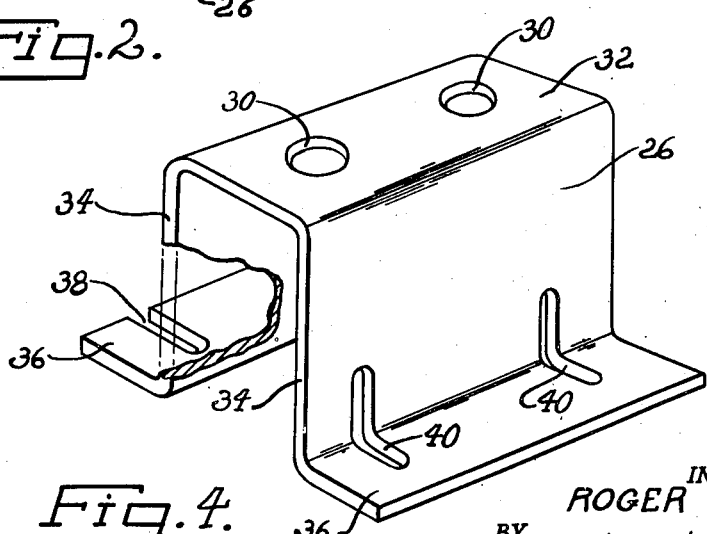
Fig. 4 is a perspective view of my improved bracket a portion of which is broken away and in section.

It will be understood that when the brackets 26 are secured to the arms 12, the engine, carrying these brackets, may be placed between the side frame members 14, with the channel portions of the brackets enclosing those bolts 23 which are to engage in openings 40, and slid forwardly in a direction indicated by the arrow in Fig. 3, until the bolts 23 are received in the slots 38 and 40. The nuts 42 are then applied to the inwardly extending bolts 23 and the brackets secured in position. The closed ends of the slots 38 and 40 limit the forward movement of the brackets 26 and engine 10.

Various changes including the size, shape and arrangement of parts may be made without departing from the spirit of my invention and it is my intention to cover by my claims such changes as may be reasonably included within the scope thereof.

I claim:

1. A bracket of the class described comprising a channel having side flanges, outwardly extending flanges on said side flanges, one of said flanges having openings therein extending through the outer edge thereof and the other of said flanges having openings therein which are continued through and into the side flange of the channel.

2. A bracket of the class described comprising channel having a base portion and side flange portions, flanges extending outwardly from said side flanges and parallel to said base portion, said base portion having openings for the reception of securing means, one of said outwardly extending flanges having openings through the marginal edge thereof for the reception of securing means and the other outwardly extending flange and the side flange being provided with a continuous opening for the reception of securing means.

3. A bracket of the class described comprising spaced parallel portions, and a connecting portion for said spaced portions, said spaced portions being provided with openings for the reception of securing means, the openings in one of said spaced portions extending continuously into the connecting portion.

ROGER K. LEE.